US 8,005,838 B2

(12) United States Patent
Van Flandern et al.

(10) Patent No.: US 8,005,838 B2
(45) Date of Patent: *Aug. 23, 2011

(54) AGGREGATING DISCOVERY DATA IN A DISCOVERY INTERFACE

(75) Inventors: Michael W. Van Flandern, Seattle, WA (US); Christen Coomer, Seattle, WA (US); Daniel L. Poling, Jr., Woodinville, WA (US); Frederic Azera, Kirkland, WA (US); Jeffrey C. Fong, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/685,626

(22) Filed: Jan. 11, 2010

(65) Prior Publication Data
US 2010/0115553 A1      May 6, 2010

Related U.S. Application Data

(63) Continuation of application No. 11/477,849, filed on Jun. 29, 2006, now Pat. No. 7,647,332.

(51) Int. Cl.
  *G06F 7/00* (2006.01)
  *G06F 17/30* (2006.01)
(52) U.S. Cl. ............................. 707/736; 707/805; 707/913
(58) Field of Classification Search .................. 707/736, 707/741, 912, 913, 920, 802, 805
See application file for complete search history.

(56) References Cited

U.S. PATENT DOCUMENTS

| | | | |
|---|---|---|---|
| 5,592,551 A | 1/1997 | Lett et al. | |
| 5,594,509 A | 1/1997 | Florin et al. | |
| 5,751,282 A | 5/1998 | Girard et al. | |
| 5,901,366 A | 5/1999 | Nakano et al. | |
| 5,914,746 A | 6/1999 | Matthews, III et al. | |
| 6,072,983 A | 6/2000 | Klosterman | |
| 6,246,442 B1 | 6/2001 | Harada et al. | |
| 7,051,291 B2 | 5/2006 | Sciammarella et al. | |
| 7,055,104 B1 | 5/2006 | Billmaier et al. | |
| 7,100,185 B2 | 8/2006 | Bennington et al. | |
| 7,117,441 B2 | 10/2006 | Allport | |
| 7,124,424 B2 | 10/2006 | Gordon et al. | |
| 7,174,512 B2 | 2/2007 | Martin et al. | |
| 7,266,832 B2 | 9/2007 | Miller | |
| 7,328,450 B2 | 2/2008 | Macre et al. | |
| 7,398,541 B2 | 7/2008 | Bennington et al. | |
| 7,421,724 B2 | 9/2008 | Klosterman et al. | |

(Continued)

FOREIGN PATENT DOCUMENTS

KR   10-2002-0028633 A     4/2002

(Continued)

OTHER PUBLICATIONS

"Synamedia(TM) Integrating Broadcast TV with Broadband IP", NDS Ltd., 2005.

(Continued)

*Primary Examiner* — Don Wong
*Assistant Examiner* — Merilyn P Nguyen

(57) ABSTRACT

A discovery interface presents aggregated discovery data in a discovery interface through which a user may select between television content and Internet Protocol content. In one implementation, the discovery interface includes a television channel region associated with a television channel that lists television programs. The discovery interface further includes an Internet Protocol content region associated with the television channel that lists Internet Protocol content based on user navigation within the television channel region.

20 Claims, 6 Drawing Sheets

U.S. PATENT DOCUMENTS

| | | | |
|---|---|---|---|
| 7,581,195 | B2 | 8/2009 | Sciammarella et al. |
| 7,647,332 | B2 | 1/2010 | Van Flandern et al. |
| 7,840,979 | B2 | 11/2010 | Poling, Jr. et al. |
| 7,908,628 | B2 * | 3/2011 | Swart et al. .................... 725/93 |
| 2002/0033848 | A1 | 3/2002 | Sciammarella et al. |
| 2002/0087661 | A1 | 7/2002 | Matichuk et al. |
| 2002/0089534 | A1 | 7/2002 | Siekmann |
| 2002/0166123 | A1 * | 11/2002 | Schrader et al. ................ 725/58 |
| 2003/0023975 | A1 | 1/2003 | Schrader et al. |
| 2003/0126607 | A1 | 7/2003 | Phillips et al. |
| 2003/0151621 | A1 | 8/2003 | McEvilly et al. |
| 2003/0184578 | A1 | 10/2003 | Cowperthwaite |
| 2004/0040041 | A1 * | 2/2004 | Crawford ....................... 725/88 |
| 2004/0078812 | A1 * | 4/2004 | Calvert ........................... 725/46 |
| 2004/0139474 | A1 | 7/2004 | Carro |
| 2004/0205816 | A1 | 10/2004 | Barrett |
| 2004/0267611 | A1 | 12/2004 | Hoerenz |
| 2005/0050576 | A1 | 3/2005 | Upendran et al. |
| 2005/0086690 | A1 | 4/2005 | Gilfix et al. |
| 2005/0091111 | A1 | 4/2005 | Green et al. |
| 2005/0160458 | A1 | 7/2005 | Baumgartner |
| 2005/0183130 | A1 * | 8/2005 | Sadja et al. ................... 725/107 |
| 2005/0210391 | A1 | 9/2005 | Othmer |
| 2005/0235321 | A1 | 10/2005 | Ahmad-Taylor |
| 2006/0031875 | A1 | 2/2006 | Yu |
| 2006/0066755 | A1 | 3/2006 | Kowald et al. |
| 2006/0156341 | A1 | 7/2006 | Kim |
| 2006/0236342 | A1 | 10/2006 | Kunkel et al. |
| 2007/0011702 | A1 | 1/2007 | Vaysman |
| 2007/0050446 | A1 | 3/2007 | Moore |
| 2007/0100984 | A1 | 5/2007 | Jansky et al. |
| 2007/0157248 | A1 | 7/2007 | Ellis |
| 2007/0186243 | A1 * | 8/2007 | Pettit et al. ..................... 725/46 |
| 2007/0204297 | A1 | 8/2007 | Gonzalez |
| 2007/0204302 | A1 | 8/2007 | Calzone |
| 2007/0234388 | A1 | 10/2007 | King |
| 2007/0240189 | A1 | 10/2007 | Paila |
| 2007/0250863 | A1 | 10/2007 | Ferguson |
| 2007/0266419 | A1 | 11/2007 | Kim |
| 2008/0004960 | A1 | 1/2008 | Coomer et al. |
| 2008/0022310 | A1 | 1/2008 | Poling, Jr. et al. |
| 2008/0046928 | A1 | 2/2008 | Poling, Jr. et al. |
| 2008/0127264 | A1 | 5/2008 | Klosterman et al. |
| 2008/0127281 | A1 | 5/2008 | Van Flandern et al. |
| 2009/0019485 | A1 | 1/2009 | Ellis et al. |

FOREIGN PATENT DOCUMENTS

| | | |
|---|---|---|
| KR | 10-2005-0041160 A | 5/2005 |
| KR | 10-2005-0116846 A | 12/2005 |
| WO | WO2004107749 | 12/2004 |

OTHER PUBLICATIONS

"Nagra Interactive Nagraguide", Nagravision Kudelski Group, 2006.

International Search Report PCT/US2007/013110, Nov. 27, 2007, pp. 1-7.

Extended European Search Report from the European Patent Office regarding Application No. 08770702.2 dated Feb. 17, 2011.

* cited by examiner

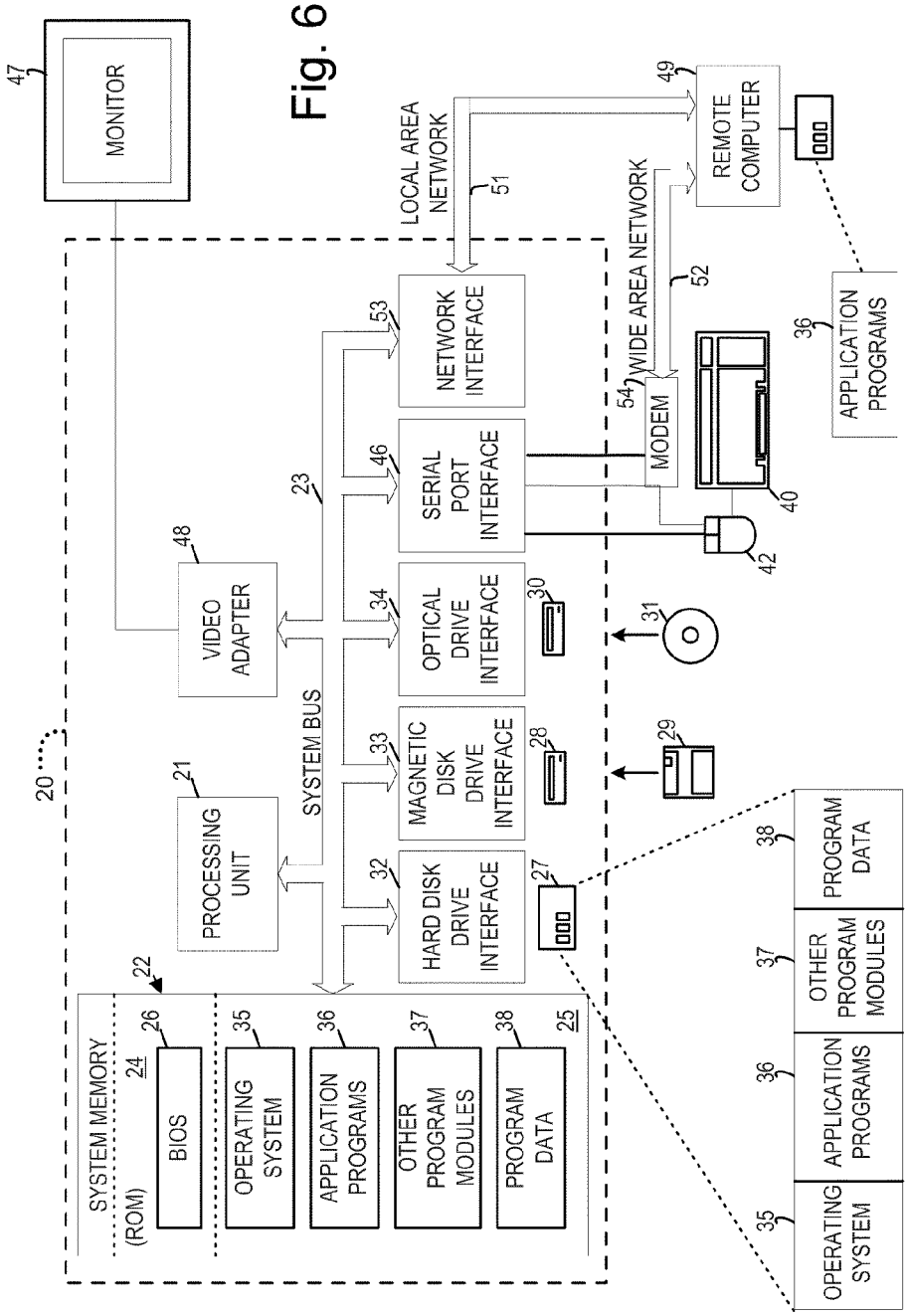

AGGREGATING DISCOVERY DATA IN A DISCOVERY INTERFACE

CROSS-REFERENCE TO RELATED APPLICATIONS

This patent application is a continuation of and incorporates by reference U.S. patent application Ser. No. 11/477,849 entitled "Aggregating Content from Multiple Content Delivery Types in a Discovery Interface," which was filed on Jun. 29, 2006 and issued as U.S. Pat. No. 7,647,332 on Jan. 12, 2010.

BACKGROUND

The convergence of computing and entertainment continues to provide new content and options for consumers. For example, cable subscribers can now access cable television programs and video-on-demand content (VOD) through their set-top boxes. In one offering, video-on-demand service allows a user to select a program for viewing from a library of programs, wherein all of the programs are available at any time and can be paused, saved, reviewed, etc. (as opposed to a cable television program that is only available at a scheduled time and duration). Other sources of content may also exist, including content from a media library, an Internet Protocol (IP) stream, a Web site, etc.

Consumers and content providers can find great benefit in the availability of content from so many different types of sources. For example, a consumer can view a rerun episode of a cable television program and then search for and view a subsequent episode of the same program over VOD or some other content providing channel. For their part, content providers can keep people "tuned in" with a wider assortment of content and content types.

Listings of available programs for a given content source are generated from discovery data (e.g., catalogs of available programming) However, existing approaches for presenting a user with choices of available content from various sources fail to provide a synergistic interface through which to access discovery data for such content. Instead, existing approaches isolate the discovery data for content of each source from the discovery data for content of all other sources. For example, a typical electronic program guide (EPG) provides cable television listings through one interface and video-on-demand content listings through a separate and distinct interface. As such, the discovery interfaces for such content provide no relationships, interactions, or cohesive user experience among content of different sources. These limitations, therefore, make it more difficult for a consumer to find the content in which they are interested and make it more difficult for a content provider to maintain the consumer's attention.

SUMMARY

Implementations described and claimed herein address the foregoing problems by providing a discovery interface that aggregates discovery data. In one implementation, discovery data relating to television content and discovery data relating to IP content (e.g., streaming video) are collected and presented to a user in a discovery interface through which the user can review and select available content via the discovery interface.

Discovery data related to available content may be visually associated within the discovery interface. In one implementation, the discovery interface includes a television channel region associated with a television channel that lists television programs. The discovery interface further includes an IP content region associated with the television channel that lists IP content based on user navigation within the television channel region. For example, a row of the discovery interface may indicate that a particular television show episode is available at a given timeslot and then, in an adjacent row, other episodes of the same show can be listed as available from an IP content provider source. As such, available IP content can be selectively presented to the user within the context of a television program listed in the television channel region, thereby intentionally tying together content of potentially common interest to the user within the discovery interface.

In some implementations, articles of manufacture are provided as computer program products. One implementation of a computer program product provides a computer program storage medium readable by a computer system and encoding a computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTIONS OF THE DRAWINGS

FIG. 6 illustrates an example system that may be useful in implementing the described technology.

DETAILED DESCRIPTIONS

Figure 1:
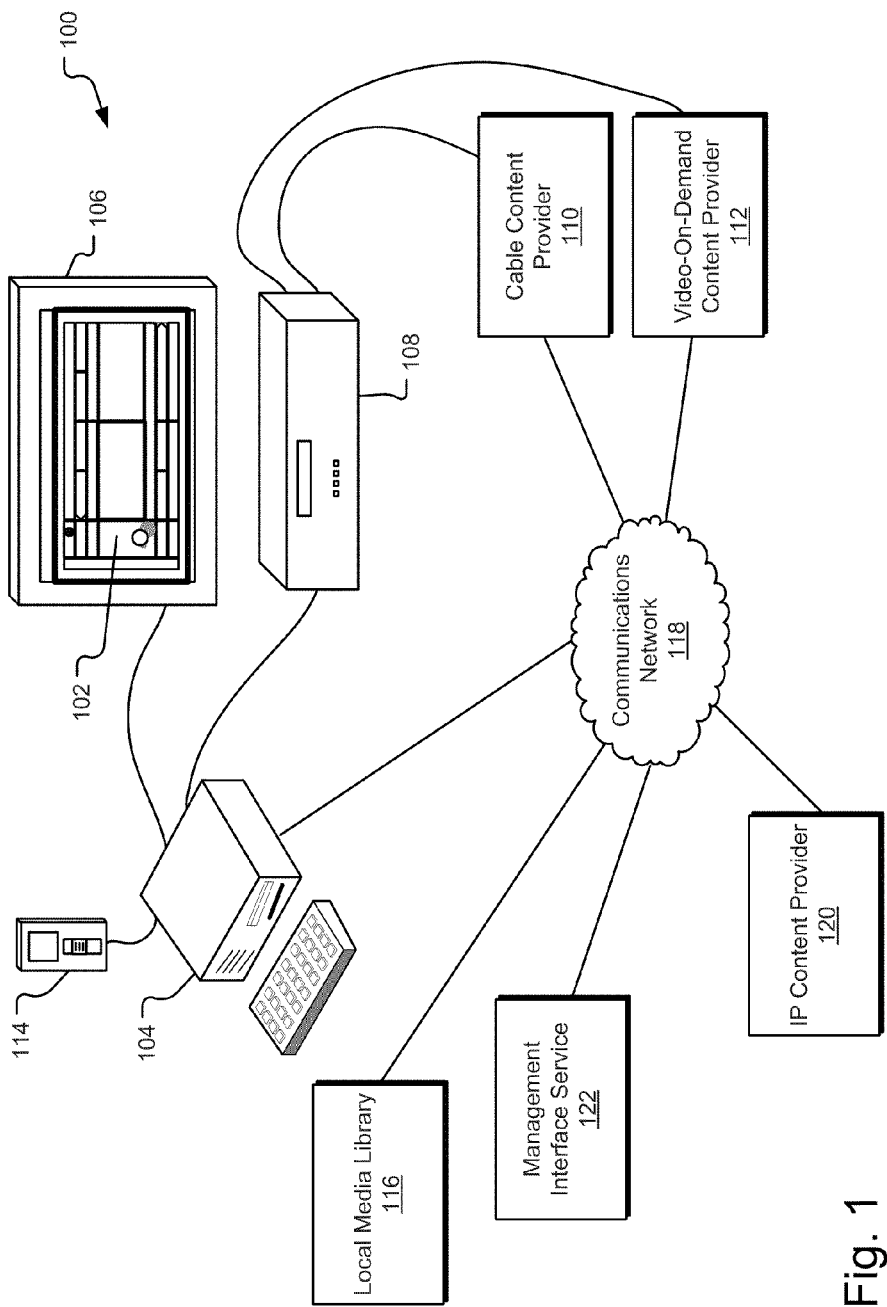
FIG. 1 illustrates an example system for presenting discovery data pertaining to content from multiple sources into a unified discovery interface.

FIG. 1 illustrates an example system 100 for presenting discovery data pertaining to content from multiple sources into a unified discovery interface 102. A user's computing system 104 is coupled to a display device 106, which is capable of presenting the unified discovery interface 102. The computing system 104 is also coupled to a tuner device 108 (e.g., a set-top box or a tuner card internal to the computing device), which communicates with a cable content provider 110 and a video-on-demand content provider 112. It should be understood that the cable content provider 110 and the video-on-demand content provider 112 may be represented by the same entity. Furthermore, content providers that compete with the cable providers, such as satellite services and airwave-based broadcast television stations, may also be supported in a similar manner. Content providers for other media, such as satellite radio, broadcast radio, etc., may also be supported through computing system 104.

In one implementation, the computing system 104 executes a media application that manages the user's access to media content, whether available locally or remotely. For example, the user can use his or her computing system 104 to control a portable media player 114, the tuner device 108, a local media library 116, and other content available from discrete devices or over a communications network 118. Examples of the control a user may apply can include without limitations transferring content between a portable media player 114 and a local media library 116, scheduling the recording of a cable television program by a digital video recorder (not shown) coupled to the computing system 104, downloading IP content (such as a video or song) from an IP content provider 120.

In one implementation, the media application also provides the discovery interface 102 on a display device 106 (e.g., a monitor or television) coupled to the computing device 104. Discovery data is obtained through a media information service 122 that collects program information about content from a variety of sources. The media information service 122 maps discovery data from a variety of sources to one or more consistent schema, enabling a consistent discovery experience, and associates content from different sources. The discovery interface 102 can be represented by an on-screen guide, such as an electronic program guide (EPG), although various monikers may be used in other implementations, including without limitation interactive program guide (IPG) and electronic service guide (ESG). In this particular implementation, the discovery interface 102 presents an on-screen guide to the available content (e.g., scheduled cable television programs, available IP content, locally stored media, etc.) and can aggregate information about content available from multiple sources into a single presentation frame.

Other unified discovery interfaces can also be used. The unified discovery interfaces, for example, may include a graphical user interface (e.g., a guide discovery interface) or may not include a graphical user interface (e.g., a channel surfing discovery interface). In the channel surfing discovery interface implementation, for example, content available via different content delivery types may be accessible by the user by pressing "channel up," "channel down," or a specific channel number on a remote control. Thus, the channel surfing discovery interface allows a user to navigate between content available via multiple content delivery types. For example, selecting channel 4 via the remote control may select content available via an NTSC broadcast, while selecting channel *4 may select IP content available via a content stream available from a web site (e.g., ABC.com). Similarly, while the user is receiving NTSC broadcast content via channel 4, pressing the "channel up" or "channel down" buttons on a remote control could navigate the user to receive IP content via channel *4.

Another implementation of a unified discovery interface is a search discovery interface that allows a user to search for content available via different content delivery devices in the same unified discovery interface. In one implementation of a search discovery interface, for example, an aggregated index or other aggregated compilation (created from aggregated discovery data) may be created to allow search through discovery data of content available via different content delivery types. Thus, in this implementation, a user may be able to search for content available via broadcast, cable television, satellite television, and/or IP delivery using the same discovery interface. The search discovery interface may further present search results obtained by searching the aggregated index or compilation, such as through a graphical user interface. In addition, the user may be able to select content identified from the search result from a graphical user interface and then navigate to the selected search result.

A browse discovery interface may also be used to provide a user the ability to browse content available via different content delivery types in any number of ways. In one implementation, for example, a user may select content by category (e.g., most popular, genre, critics choice, new, predicted relevance based on user viewing habits or profile, and the like) and the browse discovery interface may provide a listing of available content fitting that category regardless of the content delivery type.

In another implementation, a unified discovery interface may allow a user to decide between multiple offerings of the same media content. For example, the user may be provided comparative metadata to determine which offering she would like to acquire (e.g., purchase a movie via video-on-demand content now or wait to record or view the movie when it is available via a premium channel (e.g., HBO) or when it is available for free on broadcast television). Other implementations are also contemplated.

In one implementation, the discovery interface 102 provides a graphical user interface that can display program titles and other descriptive information (collectively "discovery data"), such as a summary, actors' names and bios, directors' names and bios, year of production, etc. In one implementation, the information is displayed on a grid with the option to select more information on each program, although other formats are also contemplated. Channel identifiers pertaining to the scheduled cable programs, the program start and end times, genres, thumbnail images, and other descriptive metadata can also be presented within the discovery interface 102. Radio and song information may offer other information, such as artist, album, album cover graphics, and track title information. The discovery interface 102 allows the user to browse program summaries; search by genre, channel, etc.; and obtain immediate access to the selected content, reminders, and parental control functions. If the computing device 104 is so configured or so connected, a discovery interface 102 can provide control for scheduled recording of programs.

A user can use the discovery interface 102 to navigate, select, and discover content by a variety of parameters, including time, title, channel, genre, cost, actors, directors, sources, relationships to other content, etc. Navigation can be accomplished through the media application by a variety of input devices, such as a remote control, a keyboard, and a mouse. In one implementation, for example, the user can navigate through the discovery interface 102 and display information about scheduled cable programs, video-on-demand programs, and associated IP content within a single presentation frame. By navigating through the discovery interface 102, the user can manipulate and obtain more information about a current program or about other programs available through the discovery interface 102. For example, when the computing device 104 is connected to a DVR, the user can to plan his or her viewing schedule, learn about the actors of available programs, and record cable programs to a hard disk in the computer device 104 for later viewing.

Figure 2:
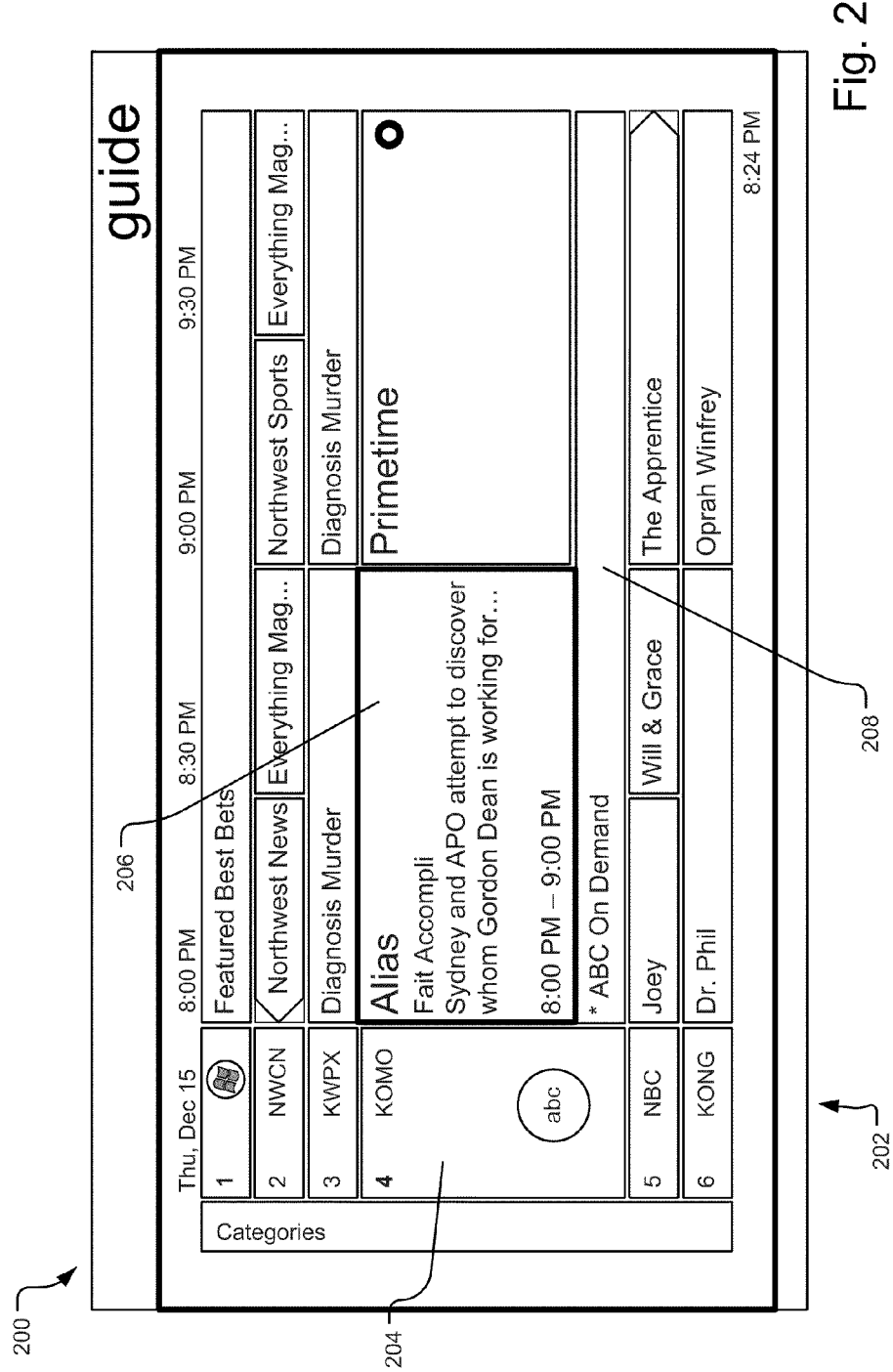
FIG. 2 illustrates an example screenshot of a unified discovery interface presenting aggregated content from multiple sources.

FIG. 2 illustrates an example screenshot 200 of a unified discovery interface presenting aggregated content from multiple sources. A gridded presentation frame presented in the discovery interface includes rows associated with specific broadcast/cable content providers (e.g., networks, local broadcast stations, etc.) and columns associated with designated time slots. The first column 202 identifies the content provider in a selectable promotional region (see e.g., the promotional region 204). By selecting the promotional region 204, a user can navigate to a promotional frame that provides more information about the content provider's offerings.

In the 8:00 PM-9:00 PM time slot for channel "4", a broadcast content region 206 presents a listing for the program "Alias", with metadata describing the episode title and an episode summary. By selecting the broadcast region 206, the user can gain access to functionality for changing the viewing channel to channel "4", scheduling a reminder to watch "Alias" at 8:00 PM on Thursday, scheduling a recording of the "Alias" episode, and a variety of other actions.

Figure 3:
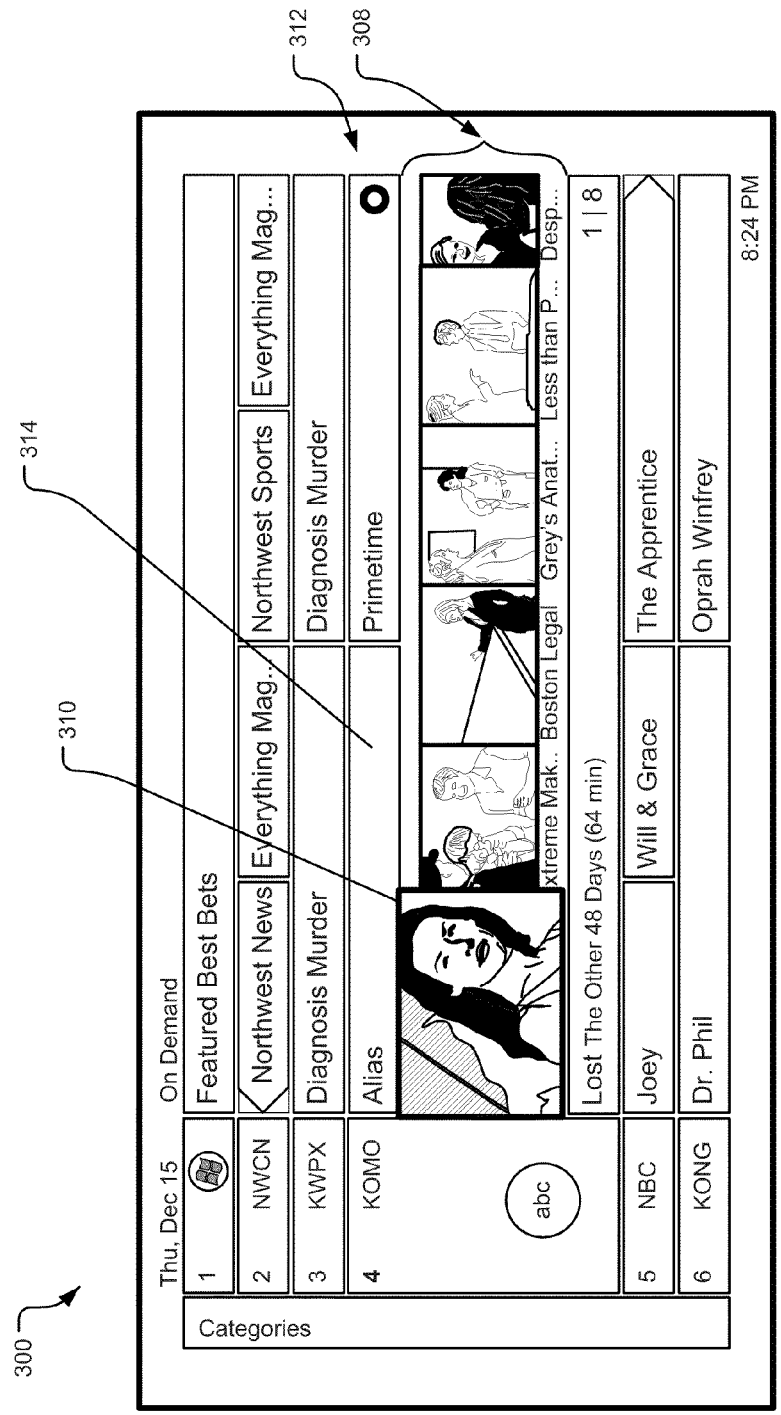
FIG. 3 illustrates another example screenshot of a unified discovery interface presenting aggregated content from multiple sources.

The bold line around the broadcast content region 206 indicates that the user has navigated to the broadcast content region 206. As such, an IP content region 208 associated with the content provider shown in the promotional region 204 is presented below the broadcast content region 206. By receiving collected catalog metadata relating to content from the broadcast content provider and an IP content provider associated with the content provider shown in the promotional region 204, the unified discovery interface can present discovery information pertaining to the content from the two different content providers. As shown in FIG. 3, the user can navigate to the IP content region 208 to gain access to the IP content associated with the content provider shown in the promotional region 204.

FIG. 3 illustrates another example screenshot 300 of a unified discovery interface presenting aggregated content from multiple sources. For example, a bold line around an IP content region 308 indicates that a user has navigated to the IP content region 308 associated with the content provider of channel "4," (i.e., ABC channel KOMO). Within the IP content region 308, the user may navigate between multiple IP content offerings provided by that content provider (or associated content providers). In the implementation of FIG. 3, for example, a user has navigated to a "Lost" episode 310, called "The Other 48 Days", that is available as IP content within the IP content region 308. Other options shown in FIG. 3 for the same content provider include "Extreme Makeover," "Boston Legal," "Grey's Anatomy," "Less than Perfect," and "Desperate Housewives," although other IP content may also be available (e.g., from navigating further right or left within the IP content region 308.

The offerings presented in the IP content region 308 can be selected by a discovery data ingestion module (see e.g., the discussion regarding FIG. 4) within the context of the associated broadcast channel region 312. For example, if the user navigated from the Alias panel 314 into the IP content region 308, the offerings listed in the IP content region 308 can be selected for display based on the user's previous position on the Alias panel 314 (e.g., based on their popularity among people who watch Alias). In alternative implementations, the offerings listed in the IP content region 308 may be dependent on other information, including appropriateness to the time slot of the user's previous position (e.g., in relation to parental ratings), compliance with parental controls set on the computing system, paid-for/sponsored-positioning within the IP content region 308, etc.

Figure 4:
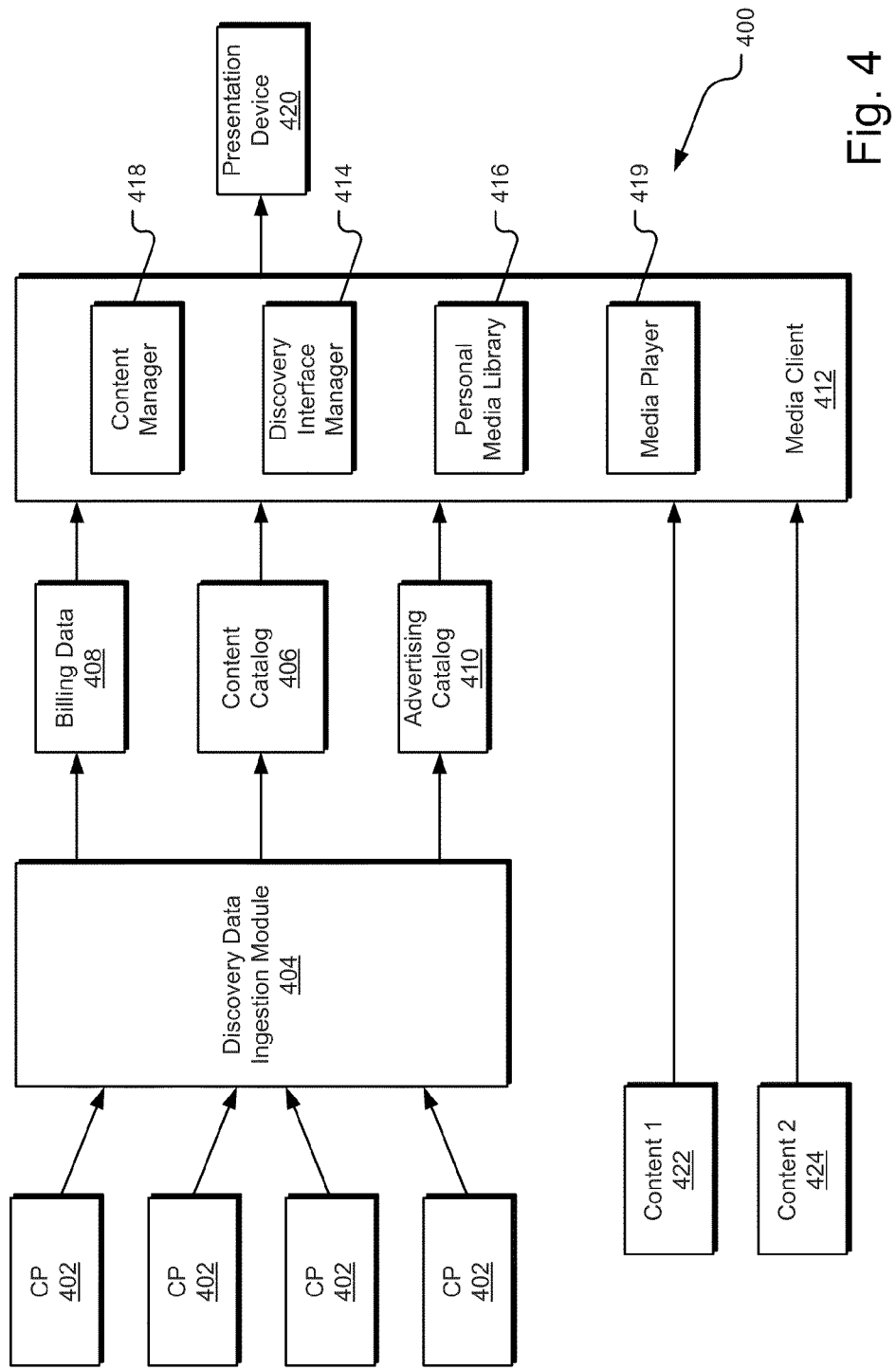
FIG. 4 illustrates an example implementation of a system for providing a unified discovery interface.

FIG. 4 shows an example implementation of a system 400 for providing a unified discovery interface. In this implementation, one or more content providers 402 provide discovery data to a discovery data ingestion module 404. The discovery data ingestion module 404 aggregates the discovery data into one or more content compilations, such as a content catalog 406. For example, cable television providers provide discovery data specifying programming details available for electronic programming guides. Likewise, available IP content can be collected into catalogs using web crawlers, search engines, predetermined offerings catalogs, etc. Such discovery data can then be combined into a content catalog 406 for display and activation within the unified discovery interface.

The discovery data ingestion module 404 can also receive and/or provide billing data 408 and advertising data, such as in an advertising catalog 410. Billing data 408, for example, may be used to process financial transactions through the discovery interface, such as a viewer purchasing media or ordering VOD content. Advertising data may be used to present advertisements through the discovery interface and potentially to tailor advertisements for individual viewers or families, in a similar manner as cookies for web sites. A media client 412 receives the discovery data from the one or more content compilations, billing data 408, and/or advertising data.

A discovery interface manager module 414 presents a unified discovery interface to a user to provide the user with a choice between media content available via at least two different types of media content delivery. When a user selects particular media content from the unified discovery interface, a content manager module 418 receives the content media and presents the content media to a media player module 419 and then ultimately to the user on a presentation device 420. The content manager module 418 may, for example, receive the media content from a personal media library 416 and/or content sources 422 and 424 associated with one or more of the content providers 402.

The content catalog 406 may, for example, contain metadata that defines an actual media content source, such as a unique identifier for that content, a source type (e.g., television or IP), and a method or protocol for accessing or retrieving the metadata (e.g., a tuning request for a live television program or an HTTP GET request and a URL to the content on an Internet server for IP content). When the user selects a particular media content via the discovery interface, the discovery interface manager accesses the metadata associated with the media content from the content catalog 406, such as using an ID reference and launches the appropriate content retrieval function based on its source type and access method. The content catalog 406 may also include metadata that allows the media client 412 to determine which promotional link is displayed (e.g., on a broadcast or other channel). For example, if a user selects the show Alias from channel 4, the content manager 418 directs an NTSC tuner to receive the Alias broadcast. Likewise, if the user selects the Lost episode from ABC.com, the content manager 418 establishes an appropriate video stream from the specified URL. If the user selects to purchase the episode of Lost from CinemaNow or Movielink, the content manager 418 initiates a download from the specified URL.

In one particular implementation, for example, the content catalog 406 includes a source field for each content entry. The source field may indicate a content delivery type (e.g., broadcast delivery or IP content delivery), which can be used to direct the content manager 418 to an appropriate source for the selected content. In addition, a promotional link to a promotional portal of the content provider can also be matched to the source field of the content catalog 406. For example, an ABC source field may be used to map ABC promotional links to ABC content. The discovery interface manager 414 of the media client 412 may also be used to determine which, if any, of the channels should receive a promotional link to a promotional portal. For example, the promotional link may only be used for the first affiliated channel in the discovery interface or only for the local affiliate, if multiple affiliates are included in the interface. In addition, the discovery interface manager 414 may also be used to block certain promotional links from appearing within the discovery interface, such as where promotion of content is blocked by a content provider.

The metadata ingestion module 404, for example, can receive discovery data, such as metadata related to media content provided (or to be provided) by a content provider. Metadata may include, without limitation, descriptive properties of media content or descriptive properties of how the content is integrated within the unified discovery interface. Metadata describing media content, for example, may include title, synopsis, genre, category, classification, review, cast, crew, artist, producer, time, duration, location, content type, content provider, source, resolution, cost, subscriber, or other data relating to particular media content. Metadata describing integration within the discovery interface may include without limitation descriptions of the contextual, demographic, or parental ratings relationships of the content with other content. For example, contextual relationships may associate content directed to a common subject matter (e.g., World War II) or genre (e.g., "The 4400", "The X-files"). Demographic relationships may associate content directed to viewers in certain age groups (e.g., a viewer browsing through Nickelodeon and/or Cartoon Network broadcast programming may see IP content directed to viewers in the 5-14 year old age group). Parental ratings relationships may prevent the display of IP content based on parental controls set up on the computing system.

Metadata may also include a globally unique identifier (GUID) or other unique identifier for individual media content. In one implementation, for example, a GUID may be used to distinguish between different media content having the same title or other attribute (e.g., an original movie and a remake of that movie). Similarly, a GUID assigned to the metadata for a particular programming may also be used to distinguish the same media content available via different content delivery types. Thus, a user may be able to choose a between different offerings of the same media content.

The discovery data ingestion module 404 receives discovery data from one or more content providers 402 and aggregates the discovery data into one or more compilations of discovery data (such as a catalog, an index, a database, etc.). In one particular implementation, for example, the data ingestion module 404 aggregates discovery data relating to media content accessible remotely via at least two different media content delivery types into a single compilation, such as a content catalog 406. The content catalog 406, for example, may include one or more repositories for metadata, such as depending on the type of media content delivery by which particular media content is available. In one implementation, the content catalog 406 may include a repository for time-based programming media content metadata (e.g., an electronic programming guide), such as broadcast television, broadcast radio, cable television, cable audio, satellite television, satellite audio, or other time-based programming content.

The content catalog 406 may further include a repository for Internet protocol media content provided by a provider or its sponsored or associated content providers. This "approved" Internet protocol content repository, for example, may include metadata for approved Internet protocol media content or Internet protocol media content provided by an approved or sponsor partner content provider. This repository, for example, may be downloaded or otherwise provided directly to a media client 412 (e.g., a user media content delivery device) to allow for quicker searching and response within unified discovery interface.

The media catalog may also include a "non-approved" Internet protocol repository. Such a non-approved repository, for example, may include metadata for media content accessible via a network (e.g., the Internet or another wide area network (WAN)). In this manner, the provider of a unified discovery interface may allow for access to a wide variety of content without being responsible for the quality or subject matter of the media content.

"Long tail" media content available, for example, on the Internet includes low circulation media content that, while not necessarily popular with the general public, may be especially relevant to interests of individual customers. In one particular implementation, for example, an end-user may provide a profile or other identifier of types of media content that are of interest and/or the unified discovery interface may predict media content that may be of interest based upon previous viewing of or listening to media content. In such an implementation, the unified discovery interface may provide a repository of suggested media content that may have been identified by sorting, searching, crawling, or otherwise analyzing of a larger repository based upon a particular user profile or prediction of user interest. In another implementation, a user may register with a third party provider to allow metadata for the third party's media content to appear in such a repository for that user's personal unified discovery interface.

Such long tail media content may be available in enormous quantities and at various quality levels such that differentiation from media content provided by the provider or approved content providers of the unified discovery interface may be useful. However, metadata for such approved and non-approved Internet protocol media content may be combined into a single repository, or completely other repository arrangements may even be used. In addition, any repositories of discovery data may be downloaded or otherwise provided to the media client 412 or may be remotely accessible by the media client 412.

Other types of data, such as billing data 408 and an advertising catalog 410, may also be provided to or otherwise accessible by the media client 412 to authorize a purchase of media content where required or to provide advertisements for display within a unified discovery interface or during presentation of media content on a presentation device 414.

The media client 412 receives discovery data from the content catalog 406, and a discovery interface manager module 414 presents a unified discovery interface to a user providing media content available via at least two types of media content delivery. Thus, media content available via different content delivery types are provided to the user in a unified discovery interface as opposed to one interface for a first content delivery type (e.g., broadcast television) and a second interface for a second content delivery type (e.g., IP content delivery). Examples of remote media content delivery types, for example, include time-based programming content delivery, Internet protocol content delivery, analog terrestrial content delivery, digital terrestrial content delivery, pay television broadcast content delivery, video-on-demand content delivery, digital video recorder content delivery, digital video disc content delivery, compact disc music content delivery, video cassette recorder content delivery, platform partner content delivery, web content delivery, longtail content delivery, and other types of remote media content delivery. Local media content, such as available via the personal media library 416, may also be included in a unified discovery interface.

A user can select particular media content for presentation from the unified discovery interface. The content manager module 418 residing on the media client 412 receives the selected media content and presents it on the presentation device 420 via a content player interface (not shown). The selected media content, for example, may be received from a remote content source 422 or 424. The remote content sources 422 and 424 may, for example, be associated with one or more content providers 402 or may be accessible from other content providers, such as longtail content providers accessible via the Internet or another WAN. Television or radio programming media content, for example, may be received and selected via a tuner in the media client 412 from a broadcast media content source, a cable source, a satellite source, or other type of television or radio media content delivery. Internet protocol media content may also be received from a server via a network, such as the Internet. Other types of media content delivery are also contemplated.

Figure 5:
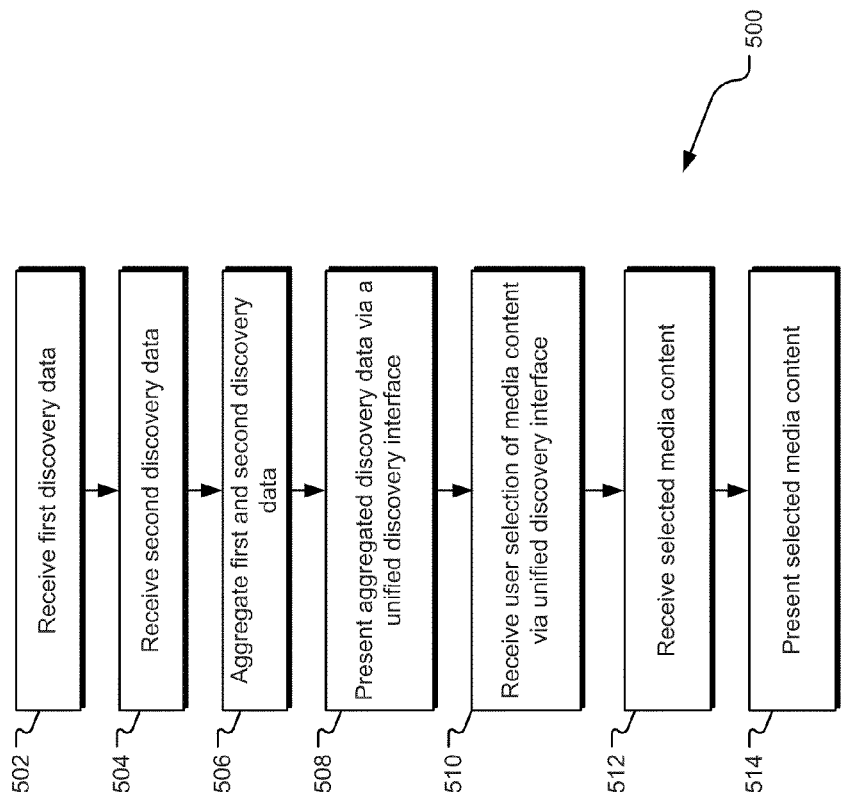
FIG. 5 illustrates example operations for aggregating discovery data for content from multiple sources into a unified discovery interface.

FIG. 5 illustrates example operations 500 for aggregating discovery data for content from multiple sources into a unified discovery interface. First discovery data related to first media content available via a first content delivery type is received in a receipt operation 502. The discovery data may be received, for example, from a content provider for the first media content, a content delivery provider (e.g., a broadcaster, cable provider, or satellite provider), a personal media library, or other sources of discovery data. The discovery data may include metadata, such as content-related metadata that describes integration of media content within a unified discovery interface. Metadata, for example, may include title, synopsis, genre, category, classification, review, cast, crew, artist, producer, time, duration, location, content type, content provider, source, resolution, cost, subscriber, or other data relating to particular media content.

Second discovery data related to second media content available via a second content delivery type is received in another receipt operation 504. The first and second discovery data received in the receipt operations 502 and 504 may be received (directly or indirectly) from the same or from different content providers. The first content delivery type, for example, may include time-based programming delivery, such as broadcast television, cable television, or satellite television, while the second content delivery type, for example, may include an alternative delivery type, such as video-on-demand, IP programming available via the Internet or another WAN, locally-stored media content, such as from a personal media library.

The first and second discovery data related to media content available via the first and second delivery types is then aggregated in an aggregation operation 506. In one implementation, for example, the discovery data may be integrated into a compilation, such as catalog, via a discovery data ingestion module for access by a client module. In such an implementation, the catalog may be remotely accessible by the client module or may be downloaded to the client module for use in presenting aggregated discovery data via a unified discovery interface. In another implementation, the discovery data may be received and aggregated via a client module that receives discovery data associated with different media content and aggregates the discovery data locally for use in a unified discovery interface.

The aggregated first and second discovery data is presented via a unified discovery interface through which a user may select between the media content available via the first content delivery type and the second content delivery type in a presentation operation 508. In one implementation, a client module presents the unified discovery interface to the user via a presentation device. The user can then review discovery data in the unified discovery device for media content available via different content delivery types and select one or more media content for presentation from that interface.

A selection of media content available via the first content delivery type or the second content delivery type is received via the unified discovery interface in a selection operation 510. The selected media content is then received from a content source in a receipt operation 512 and is presented to a user via a presentation device in a presentation operation 514.

The example hardware and operating environment of FIG. 6 for implementing the invention includes a computing device, such as general purpose computing device in the form of a gaming console or computer 20, a mobile telephone, a personal data assistant (PDA), a set top box, or other type of computing device. In the implementation of FIG. 6, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 6. The logical connections depicted in FIG. 6 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are example and other means of and communications devices for establishing a communications link between the computers may be used.

In an example implementation, a discovery data ingestion module, a download module, a discovery interface module, and other modules may be embodied by instructions stored in memory 22 and/or storage devices 29 or 31 and processed by the processing unit 21. A personal media library, various catalogs and content, and other data may be stored in memory 22 and/or storage devices 29 or 31 as persistent datastores.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts descried above. Rather, the specific features and acts described above are disclosed as example forms of implementing the claimed subject matter.

What is claimed is:

1. A method of presenting aggregated discovery data in a discovery interface, the method comprising:
   receiving first discovery data and second discovery data; and
   presenting aggregated discovery data including the first discovery data and the second discovery data in a discovery interface on a display device through which a user may select between television content related to the first discovery data and Internet Protocol content related to the second discovery data, the discovery interface comprising:
   a television channel region that is associated with a television channel of a content provider and that lists television programs available from the content provider, and
   an Internet Protocol content region that is associated with the television channel of the content provider and that lists Internet Protocol content related to the television programs available from the content provider based on user navigation to a television program listing within the television channel region.

2. The method of claim 1 wherein the first discovery data comprises metadata relating to the television content.

3. The method of claim 2 wherein the first discovery data further comprises metadata relating to a relationship between the television content and other media content.

4. The method of claim 1 wherein the first discovery data is received in a compilation of data downloaded from a server via a wide area network.

5. The method of claim 4 wherein the compilation of data includes the second discovery data.

6. The method of claim 1 further comprising:
   aggregating the first discovery data and the second discovery data into a search index;
   searching the search index; and
   presenting a search result.

7. The method of claim 1 wherein:
   the television content comprises broadcast television content, and
   the Internet Protocol content comprises video on-demand content.

8. The method of claim 1 wherein the television content comprises Internet Protocol television content.

9. A computer-readable storage medium having stored computer-executable instructions that, when executed by a computing device, perform a computer process comprising:
   receiving first discovery data and second discovery data; and
   presenting aggregated discovery data including the first discovery data and the second discovery data in a discovery interface on a display device through which a user may select between television content related to the first discovery data and Internet Protocol content related to the second discovery data, the discovery interface comprising:

a television channel region that is associated with a television channel of a content provider and that lists television programs available from the content provider, and an Internet Protocol content region that is associated with the television channel of the content provider and that lists Internet Protocol content related to the television programs available from the content provider based on user navigation to a television program listing within the television channel region.

10. The computer-readable storage medium of claim 9 wherein the first discovery data comprises metadata relating to the television content.

11. The computer-readable storage medium of claim 10 wherein the first discovery data further comprises metadata relating to a relationship between the television content and other media content.

12. The computer-readable storage medium of claim 9 wherein the first discovery data is received in a compilation of data downloaded from a server via a wide area network.

13. The computer-readable storage medium of claim 12 wherein the compilation of data includes the second discovery data.

14. The computer-readable storage medium of claim 9 further comprising computer-executable instructions for:
   aggregating the first discovery data and the second discovery data into a search index;
   searching the search index; and
   presenting a search result.

15. The computer-readable storage medium of claim 9 wherein:
   the television content comprises broadcast television content, and
   the Internet Protocol content comprises video on-demand content.

16. The computer-readable storage medium of claim 9 wherein the television content comprises Internet Protocol television content.

17. A media content delivery device comprising one or more processors for executing computer-executable program modules stored on computer-readable storage media, the program modules comprising:
   a discovery interface module that presents a discovery interface including first discovery data and second discovery data on a display device through which a user may select between television content related to the first discovery data and Internet Protocol content related to the second discovery data, the discovery interface comprising:
      a television channel region that is associated with a television channel of a content provider and that lists television programs available from the content provider, and
      an Internet Protocol content region that is associated with the television channel of the content provider and that lists Internet Protocol content related to the television programs available from the content provider based on user navigation to a television program listing within the television channel region; and
   a content player interface module that presents television content and Internet Protocol content selected by the user for presentation on the display device.

18. The media content delivery device of claim 17, the program modules further comprising:
   a search discovery interface module that aggregates the first discovery data and the second discovery data into a search index, searches the search index, and presents a search result.

19. The media content delivery device of claim 17 wherein:
   the television content comprises broadcast television content, and
   the Internet Protocol content comprises video on-demand content.

20. The media content delivery device of claim 17 wherein the television content comprises Internet Protocol television content.

\* \* \* \* \*